United States Patent
Ruckart

(10) Patent No.: US 7,738,479 B2
(45) Date of Patent: Jun. 15, 2010

(54) METHODS, SYSTEMS, AND COMPUTER PROGRAM PRODUCTS FOR MULTI-CHANNEL COMMUNICATIONS USING UNIVERSAL ADDRESS BOOK SERVER

(75) Inventor: John Ruckart, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 869 days.

(21) Appl. No.: 11/294,054

(22) Filed: Dec. 5, 2005

(65) Prior Publication Data

US 2007/0058658 A1 Mar. 15, 2007

Related U.S. Application Data

(60) Provisional application No. 60/717,219, filed on Sep. 15, 2005.

(51) Int. Cl.
*H04B 7/212* (2006.01)

(52) U.S. Cl. ...................................... 370/444; 709/238

(58) Field of Classification Search ................. 370/444; 455/414.3; 709/238; 725/121, 63, 67, 86
See application file for complete search history.

(56) References Cited

U.S. PATENT DOCUMENTS

| | | | |
|---|---|---|---|
| 4,445,118 A | 4/1984 | Taylor et al. | |
| 5,418,538 A | 5/1995 | Lau | |
| 5,663,734 A | 9/1997 | Krasner | |
| 5,663,735 A | 9/1997 | Eshenbach | |
| 6,433,735 B1 | 8/2002 | Bloebaum et al. | |
| 7,194,757 B1 * | 3/2007 | Fish et al. | 725/121 |
| 2002/0007421 A1 * | 1/2002 | Dixon et al. | 709/238 |
| 2003/0011511 A1 | 1/2003 | King et al. | |
| 2005/0181775 A1 * | 8/2005 | Rideout et al. | 455/414.3 |

OTHER PUBLICATIONS

"Instant Messaging" from Wikipedia http://en.wikipedia.org/wiki/Instant_messanger, (2007).

* cited by examiner

*Primary Examiner*—Albert T Chou
(74) *Attorney, Agent, or Firm*—Myers Bigel Sibley & Sajovec, P.A.

(57) ABSTRACT

A method of providing communications can include forwarding a message from a universal address book server via a plurality of communications channels associated with an addressee of the message based on a priority of the message received at the universal address book server. Related systems and computer program products are also disclosed.

13 Claims, 5 Drawing Sheets

METHODS, SYSTEMS, AND COMPUTER PROGRAM PRODUCTS FOR MULTI-CHANNEL COMMUNICATIONS USING UNIVERSAL ADDRESS BOOK SERVER

CROSS REFERENCE RELATED APPLICATION

This application is related to and claims the priority of U.S. Provisional Patent Application Ser. No. 60/717,219, filed Sep. 15, 2005, entitled Systems and Methods for Distributing a Message Using Universal Address Book, the disclosure of which is hereby incorporated herein by reference.

FIELD OF THE INVENTION

The present invention generally relates to the field of electronic communications.

BACKGROUND

A wide variety of means exist for communication between users. For example, a user may be contacted via a home phone, work phone, mobile phone etc. In addition, users may also communicate using devices such as PC's, PDA's, pagers, etc. using, for example, email and instant messaging.

Managing such a wide variety of communications for these devices can be difficult, such as, when a user changes location. For example, while traveling, it may only be possible to reach a user via the user's mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office, all of which may be unknown to those who wish to contact the user.

SUMMARY

Embodiments according to the invention can provide methods, systems, and computer program products for multi-channel communications using universal address book server. Pursuant to these embodiments, a method of providing communications can include forwarding a message from a universal address book server via a plurality of communications channels associated with an addressee of the message based on a priority of the message.

In some embodiments according to the invention, forwarding includes transmitting respective separate messages via the plurality of communications channels. In some embodiments according to the invention, transmitting further includes transmitting the respective separate messages via the plurality of communications channels for substantially simultaneous delivery to a plurality of user devices associated therewith.

In some embodiments according to the invention, transmitting further includes transmitting a first one of the respective separate messages via a respective one of the plurality of communications channels that is designated as a primary communications channel. Remaining separate messages are transmitted via remaining ones of the plurality of communications channels if a response to the first one of the respective separate messages is not received by the universal address book server before expiration of a time interval. The respective remaining separate messages are avoiding from being transmitted via the remaining ones of the plurality of communications channels if the response is received by the universal address book server before expiration of a time interval.

In some embodiments according to the invention, transmitting further includes transmitting each of the respective separate messages to respective ones of the plurality of communications channels after expiration of a respective time interval unless a response to a previously transmitted separate message is received by the universal address book server before expiration of the respective time interval for the previously transmitted separate message.

In some embodiments according to the invention, the respective time intervals associated with the respective separate messages are different time intervals. In some embodiments according to the invention, the method further includes transmitting an alert upon receiving a response to any of the respective separate messages.

In some embodiments according to the invention, transmitting further includes transmitting the respective separate messages via the plurality of communications channels to respective different addressee user devices. In some embodiments according to the invention, the plurality of communications channels can be an e-mail address, a mobile telephone number, a facsimile number, a home telephone number, a work telephone number, a voice mail telephone number, a messenger address, Internet Protocol (IP) address, and/or a pager telephone number.

In some embodiments according to the invention, a universal address book system includes a universal address book server configured to forward a message via a plurality of communications channels associated with an addressee of the message based on a priority of the message.

In some embodiments according to the invention, a computer program product for providing communications includes a computer readable medium having computer readable program code embodied therein, the computer readable program product computer readable program code is configured to forward a message from a universal address book server via a plurality of communications channels associated with an addressee of the message based on a priority of the message.

DESCRIPTION OF THE EMBODIMENTS ACCORDING TO THE INVENTION

Figure 1:
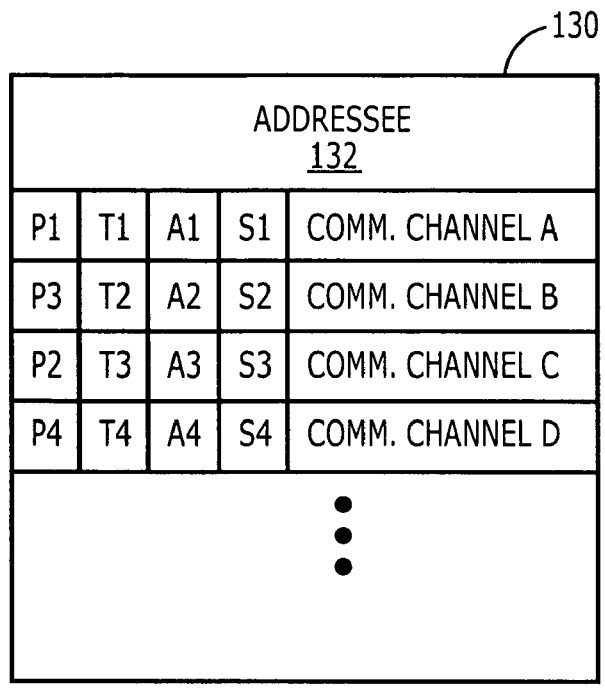
FIG. 1 is a schematic representation of a universal address book server including addressee entries and a plurality of communication channels associated therewith in some embodiments according to the invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

As used herein the term "universal address book server" refers to software applications that can store information associated with entries therein, such as communication channels associated with addressees for access by messaging clients (such as an e-mail client). The universal address book server can store information so that any messaging client device, regardless of the type of communications network the device uses primarily for communications, may access the information stored therein. For example, the universal address book server may be located on a server on the Internet so that any user device that can communicate via the Internet may access the universal address book server for the creation and/or forwarding of messages.

It will be understood that communication between the universal address book server and the message client may be via one or more gateways used to interconnect different communications networks. In this way, a cellular telephone, for example, may be used to create/forward an SMS message to an addressee, using the universal address book server located on the Internet, to another cellular telephone via one of the communication channels associated with the addressee in the universal address book server. Alternatively, the universal address book server may be on the Public Switched Telephone Network (PSTN) or may be part of the wireless communications system (such as embedded in a Mobile Switching Center) which provides service to the cellular telephones.

The present invention is described below with reference to diagrams (such as block diagrams, schematic diagrams, and flowcharts) and/or operational illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, or store the program for use by or in connection with the instruction execution system, apparatus, or device.

The computer-usable or computer-readable medium may be, for example but not limited to, an electronic, magnetic, optical, electromagnetic, infrared, or semiconductor apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The computer program code may be provided to a processor of a general purpose computer, special purpose computer, or other programmable data processing apparatus as instructions to produce a machine, such that the instructions, which execute via the processor of the computer or other programmable data processing apparatus, create means for implementing the functions specified in the block and/or flowchart block or blocks.

The computer code may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

Embodiments of universal address book servers according to the invention can operate in a logically separated client side/server side-computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. For example, in some embodiments according to the invention, the universal address book server may operate on a separate system (on the Internet) so that the client operating, for example, on a cellular telephone can be used to create a high priority message for forwarding by accessing the universal address book server on the separate system. In other embodiments according to the invention, the universal address book server is located within the cellular telephone with the client. In this sense, in some embodiments according to the invention, the universal address book server and the client can be integrated into one application.

Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, through which requests for information, such as entries from the universal address book server, can be initiated. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser.

It will be understood that at least a portion of the communications described herein can be provided according to Session Initiation Protocol (SIP), which is described in more detail in, for example, "Internet Communications Using SIP," by Henry Sinnreich, ISBN: 0-471-41399-2. Internet Protocol communications are generally described in, for example, "TCP/IP Protocol Suite," by Behrouz A Forouzan, ISBN: 0-07-119962-4. Moreover, techniques for the creation and operation of virtual communities, is described in, for example, "Design for Community: The Art of Connecting Real People in Virtual Places," by Derek M. Powazek, ISBN: 0-7357-1075-9. The content these references is incorporated herein by reference.

As described hereinbelow in greater detail, universal address book servers, according to some embodiments of the invention, can provide for forwarding of high priority messages via a plurality of communication channels associated with an addressee included in the universal address book server. In some embodiments according to the invention, a high priority message is forwarded by the universal address book server to an addressee via all communication channels that are associated therewith. In other embodiments according to the invention, time interval entries are associated with the plurality of communication channels for an addressee. The universal address book server can forward an initial message over a primary communications channel having a first time interval associated therewith. If a response to the message sent via the primary communication channel is not received within a first time interval, separate messages are forwarded via the remaining communication channels associated with the addressee. In still other embodiments according to the invention, separate messages can be forwarded in a serial "daisy-chained" manner after the expiration of an associated time interval entry associated with the respective communication channel in the universal address book server until a response is received.

FIG. 1 is a schematic illustration of a universal address book server 130 according to some embodiments of the invention. In particular, the universal address book server 130 includes an addressee 132 to which messages may be addressed. The addressee 132 has an associated plurality of communication channels A-D each of which may be used to forward messages to the addressee 132. The plurality of communication channels A-D have associated priority entries P1-P4 which indicate the order in which the communication channels A-D should be used when forwarding urgent messages to the addressee 132. For example, priority entry P1 associated with communication channel A indicates that communication channel A is to be used as the primary communication channel when forwarding messages to addressee 132. Similarly, priority entry P2 indicates that communication channel C is the secondary communication channel to be used when forwarding messages to addressee 132. It will be understood that priority entries P3 and P4 associated with communication channels B and D, respectively, can be used following the forwarding of a message to communication channels A and C. It will be understood that in some embodiments according to the invention, the priority of the message can be based on the urgency, importance, etc. of the associated message, which can be assigned to the message by the originator of the message.

Still referring to FIG. 1, time interval entries T1-T4 are associated with respective communication channels A-D and indicate the time interval which may be inserted between the transmission of sequential messages via the respective communication channel A-D. For example, in some embodiments according to the invention, if a message is forwarded to the addressee 132 via the primary communication channel A, the universal address book server 130 can wait for the time interval T1 before forwarding a subsequent message via communication channel C. In some embodiments according to the invention, each communication channel A-D may have an associated time interval before which a subsequent message would be forwarded via the communication channel having the next priority.

It will be understood that the time intervals can be predetermined specific times, such as a number of seconds, minutes, hours, etc. or randomized. In still further embodiments according to the invention, the time interval may be based on the priority of the message. For example, the first time interval (associated with the primary communications channel) may have a short time interval when the message priority is relatively high or relatively long when the priority is lower. In further embodiments according to the invention, differences between the time intervals may be predetermined. For example, the time interval for each successive channel may be less than the time intervals for the preceding channels.

In some embodiments according to the invention, alert entries A1-A4 indicate whether an alert is to be generated by the universal address book server 130 upon receipt of a response to a message forwarded via a respective communication channel A-D. For example, if a response to a message forwarded on communication channel B is received within time interval T2, an alert will be provided by the universal address book server 130 if alert entry A2 is "on."

In some embodiments according to the invention, status entries S1-S4 indicate whether a response to a message has been received. For example, if a response to the message sent via communication channel A is received (within or after the first time interval), the status entry S1 can be set, otherwise the status entry S1 can remain cleared. In still further embodiments according to the invention, the status entries S1-S4 can include other information, such as when the response was received. In some embodiments according to the invention, status entries S1-S4 can indicate whether a message has been forwarded, delivered, viewed, heard etc. via the respective communication channel.

It will be understood that in some embodiments according to the invention, the plurality of communication channels A-D can be information used to forward messages to the addressee 132, such as cellular telephone numbers, home phone numbers, work phone numbers, email addresses, pager numbers, voicemail numbers, instant messenger (IM) addresses, Internet Protocol (IP) addresses, fax telephone numbers, or the like. It will be further understood that the IM addresses can be any address that identifies a user of system that allows text communications between user, such as those described further, for example, at http://en.wikipedia.org/wiki/Instant_messenger_comparison#General_information.

The communications used for forwarding the messages from the Universal Address Book Server may be provided using an Internet Protocol (IP) Multimedia Subsystem (IMS). IMS can utilize a packet switched domain (such as the Internet) to transport multimedia signaling and bearer traffic. The message forwarding may be provided, for example, via a Universal Mobile Telecommunication System (UMTS) to access multimedia services of IMS. IP Multimedia Systems are discussed in each of the following: (1) 3GPP TS 22.228 entitled "Service Requirements for the IP Multimedia Core Network Subsystems"; (2) 3GPP TS 23.228 entitled "IP Multimedia Subsystems"; and (3) 3GPP TR 22.941 entitled "IP Based Multimedia Services Framework." The subject matter of each of these references is hereby incorporated by reference.

It will be understood that messages can be provided via Short Message Service (SMS), Enhanced Message Service (EMS), Multimedia Message Service (MMS), and/or Smartmessaging™. As is known to those skilled in the art, SMS and EMS messages can be transmitted on digital networks, such as GSM networks, allowing relatively small text messages (for example, 160 characters in size) to be sent and received via a network operator's message center to the user device, or via the Internet, using a so-called SMS (or EMS) "gateway."

Furthermore, it will be understood that although only four communication channels A-D are shown in FIG. 1, the universal address book server 130 may include a fewer or greater number of communication channels associated with addressee 132. Furthermore, the universal address book server 130 can include a plurality of addressees each having associated plurality of communication channels that can be used to forward urgent messages to the associated addressee.

Figure 2:
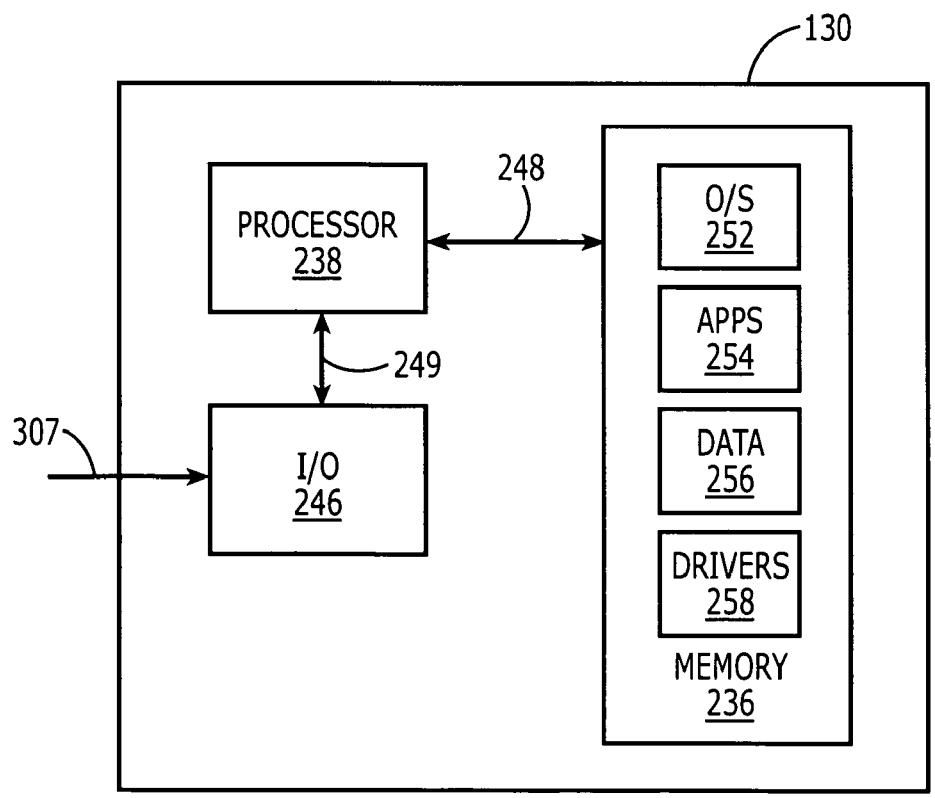
FIG. 2 is a block diagram that illustrates an exemplary universal address book server according to some embodiments of the invention.

FIG. 2 is a block diagram of an exemplary universal address book server 130 in some embodiments according to the invention. As illustrated, the universal address book server 130 includes a processor 238, a memory 236 and input/output (I/O) circuits 246. The universal address book server 130 may be incorporated in, for example, a general purpose computer, server, or the like. The processor 238 communicates with the memory 236 via an address/data bus 248 and communicates with the input/output circuits 246 via an address/data bus 249.

The universal address book server 130 can be accessed by a user via the network 115 through the input/output circuits 246 using, for example, an Internet Protocol (IP) connection to create/forward messages (such as e-mail messages) to addressees. The messages created using the universal address book server 130 can be forwarded to an addressee included as an entry therein. If the priority of the message indicates that the message is a "high priority" message, the universal address book server 130 can forward the message via the plurality of communication channels associated with the addressee of the message. The messages forwarded by the universal address book server can also be forwarded via the input/output circuits 246.

The components in the universal address book server 130 may be known components such as those used in many data processing systems, which may be configured to operate as described herein. In particular, the processor 238 can be any commercially available or custom microprocessor, microcontroller, digital signal processor or the like. The memory 236 may include any memory devices containing the software and data used to implement the functionality circuits or modules used in accordance with embodiments of the present invention. The memory 236 can include, but is not limited to, the following types of devices: cache, ROM, PROM, EPROM, EEPROM, flash memory, SRAM, DRAM and magnetic disk.

As further illustrated in FIG. 2, the memory 236 may include several categories of software to provide operation of the universal address book server 130: an operating system 252; application programs 254 including the software to provide the operations of the universal address book server described herein, translation between message formats, software to detect responses to messages within respective time intervals and the like; input/output device drivers 258; and data 256.

In some embodiments according to the invention, the applications software 254 can convert messages to/from various formats so that a plurality of communication channels specified for a particular addressee may be used to forward high priority messages. For example, the application software 254 can include a text to voice conversion function that allows the conversion of incoming email messages to audio which can then be forwarded over a respective communications channel for delivery to a voice based user device, such as a PSTN telephone, a VOIP telephone, voicemail, etc. Furthermore, the application software 254 can include software to convert voice based messages to text, such as to convert a voice message to an email message that is forwarded over a respective communications channel for addressee's email address.

The data 256 represents the static and dynamic data used by the application programs 254, the operating system 252, and the input/output device drivers 258, that may reside in the memory 236. The data 56 can include the entries, information related to associated communications channels, time interval entries, priority level entries, alert entries, etc. described herein.

As will be appreciated by those of skill in the art, the operating system 252 may be any operating system suitable for use with a data processing system, such as OS/2, AIX or zOS from International Business Machines Corporation, Armonk, N.Y., Windows 95, Windows 98, Windows 2000 or Windows XP from Microsoft Corporation, Redmond, Wash., Unix or Linux.

The input/output device drivers 258 typically include software routines accessed through the operating system 252 by the application programs 254 to communicate with devices such as the input/output circuits 246 and the memory 236.

Figure 3:
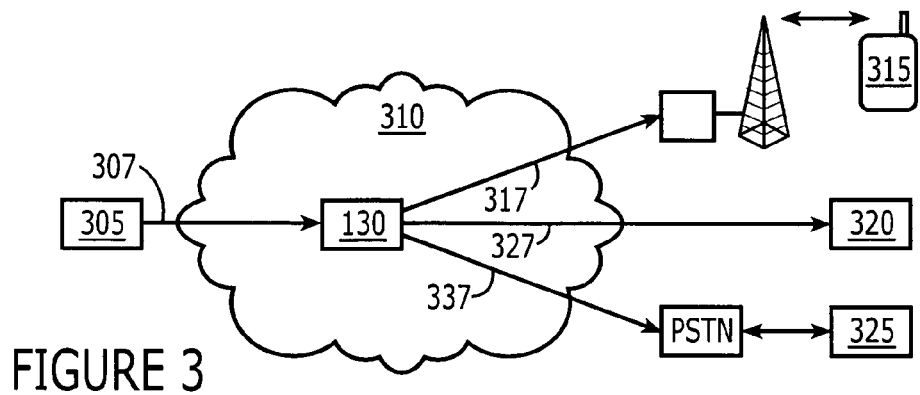
FIG. 3 is a schematic representation of a communications network including a universal address book server according to some embodiments of the invention.

FIG. 3 is a schematic illustration of a communication network including a universal address book server 130 according to some embodiments of the invention. In particular, a user device 305 can be used to create a message 307 directed to an addressee included as an entry in the universal address book server 130. According to FIG. 3, the universal address book server 130 is included in a network 310, such as the Internet, to which the user device 305 has access.

The user device 100 can be any device that is capable of creating messages for transmission to addressees, such e-mail messages. Alternatively, the user device 100 may be a single or dual mode cellular telephone with or without a multi-line display; a Voice over IP telephone; a Personal Communications System (PCS) terminal that may combine a cellular telephone with data processing, facsimile and data communications capabilities; a Personal Data Assistant (PDA) that can include a mobile terminal, pager, Internet/intranet access, Web browser, organizer, calendar, a conventional laptop and/or palmtop computer. It will be understood that although FIG. 3 shows a single user device 305 as accessing the universal address book server 130, more devices may access the universal address book server 130.

It will be understood that the message 307 can be a "high priority message" to an addressee included in the universal address book server 130 as described above in reference to FIG. 1. In particular, the addressee 132 has an associated plurality of communication channels 317, 327, and 337 over which messages may be forwarded to respective user devices 315, 320, and 325 based on the high priority message 307 received at the universal address book server 130. As shown in the exemplary embodiments illustrated by FIG. 3, the user device 315 can be a cellular telephone that operates within a wireless communication network, the user device 320 can be a computer connected to the Internet, and the user device 325 can be a voice-over IP telephone (or conventional telephone) that is connected to the public switched telephone network. Other types of user devices can also be used.

In operation, it will be understood that the user device 305 can provide a message in different forms, such as an audio form (such as a telephone message), and/or a text message, such as an SMS message generated by a cellular telephone or email generated by a personal computer or any device capable of operating an email client. In some embodiments according to the invention, the messages forwarded via the plurality of communication channels 317, 327, and 337 are transmitted substantially simultaneously by the universal address book server 130. In some embodiments according to the invention, the messages forwarded via the plurality of communication channels 317, 327, and 337 are transmitted according to a sequence wherein one of the plurality of communication channels is designated as a primary communication channel, which is used first to forward an urgent message to an addressee. If a response to the message forwarded via the primary communication channel is not received within a time interval associated with the primary communication channel, in some embodiments according to the invention, additional copies of the messages are forwarded via the remaining communication channels. In other embodiments according to the invention, each of the plurality of communication channels 317, 327, and 337 has an associated time interval wherein messages are forwarded after the expiration of the time interval associated with the immediately preceding communication channel.

Figure 4:
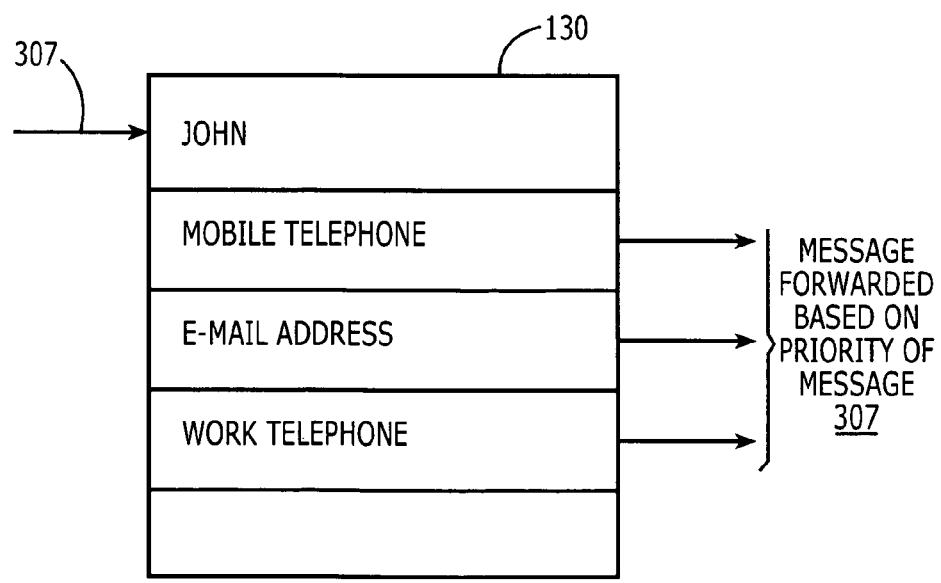
FIG. 4 is a schematic representation of a universal address book server according to some embodiments of the invention.

FIG. 4 is a schematic representation of a universal address book server 130 according to some embodiments of the invention. In particular, universal address book server 130 includes an addressee "John" and an associated plurality of communication channels designated as a mobile telephone number, an email address, and a work telephone number for "John". In operation, the universal address book server 130 can be accessed to create and/or forward a high priority message 307 directed to the addressee "John" whereupon the universal address book server 130 forwards three separate messages via the plurality of communication channels based on the high priority message 307. For example, the universal address book server 130 can forward a first message to John's mobile telephone, a second message to John's email address, and a third message to John's work telephone. As described above, the universal address book server 130 can include software functions for the conversion of the high priority message 307 to/from voice/text formats. Accordingly, if the incoming high priority message 307 is in a voice format, the universal address book server 130 can convert the voice message 307 to text format for the forwarding of the message via the email communication channel associated with "John."

Figure 5:
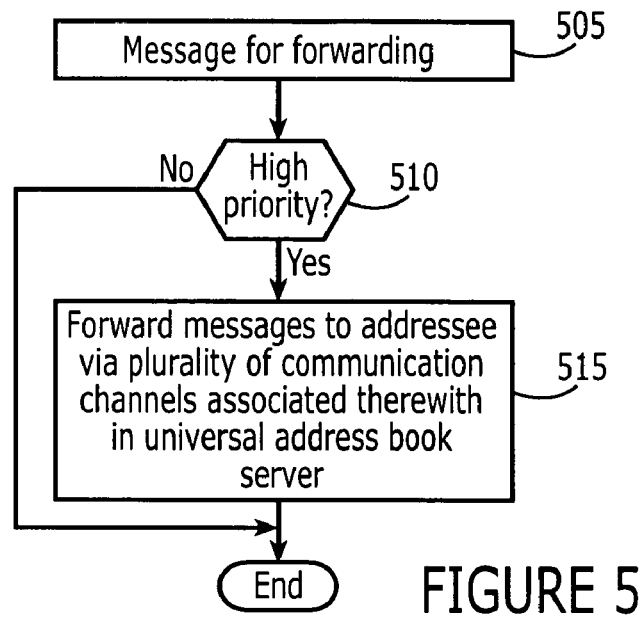
FIG. 5 is a flowchart that illustrates operations of a universal address book server according to some embodiments of the invention.

As shown in FIG. 5, in operation the universal address book server 130 first determines whether a message for creation/forwarding (block 505) is a high priority message (block 510). If the message to be forwarded is not a high priority message (block 510), further processing of the message via the universal address book server 130 is done by known techniques. If, however, the message to be forwarded is a high priority message (block 510), the universal address book server 130 forwards a copy of the message over each of the plurality of communication channels associated with the addressee (block 515). It will be understood that each of the separate messages forwarded by the universal address book server 130 may be transmitted essentially simultaneously from the universal address book server 130. It will be understood that, in some embodiments according to the invention, the universal address book server 130 may continue to forward the messages via the plurality of communications channel until a response is received.

Figure 6:
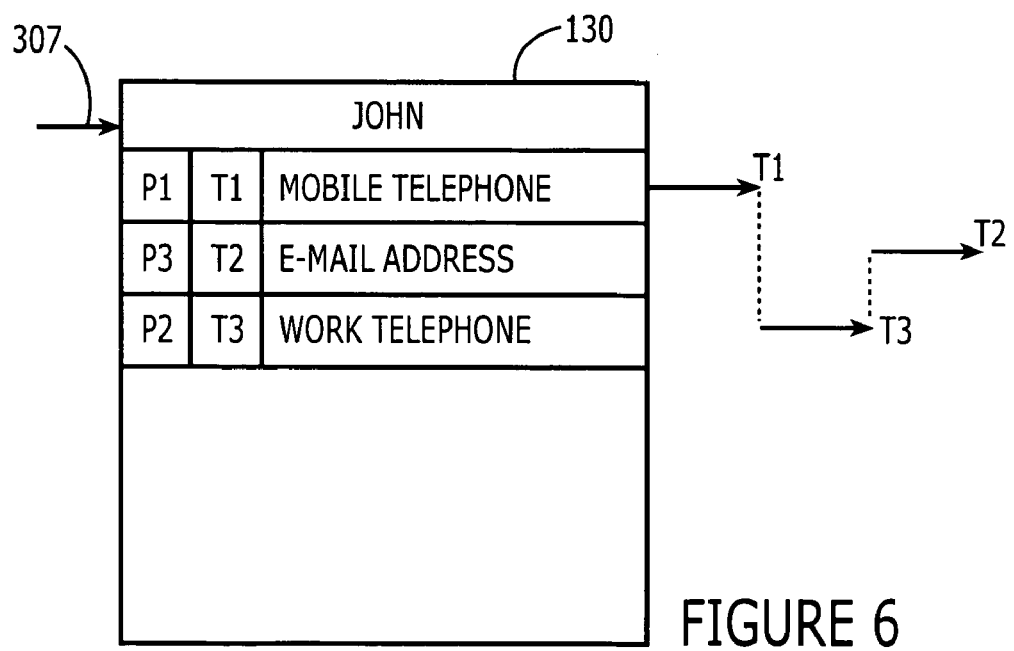
FIG. 6 is a schematic representation of a universal address book server according to some embodiments of the invention.

FIG. 6 is a schematic illustration of a universal address book server 130 according to some embodiments of the invention. In operation, the universal address book server 130 is accessed to create/forward the high priority message 307 to addressee "John." As shown in FIG. 6, each of the plurality of communication channels associated with addressee "John" in the universal address book server 130 has an associated priority level P1-P2. In particular, the mobile telephone communication channel has an associated priority level P1, the email communication channel has an associated priority level P3, and the work telephone communication channel has an associated priority level P2.

In operation, the respective priority levels indicate the order in which messages are to be forwarded via the respective communication channel. Furthermore, the respective communication channels have associated time intervals T1-T3 wherein the respective time interval indicates that time delay that is introduced before the transmission of the next subsequent message by the universal address book server 130. For example, the mobile telephone communication channel has an associated priority level P1 which indicates that the mobile telephone communication channel is the primary communication channel to be used for high priority messages sent to the addressee "John." Furthermore, the time interval T1 associated with the mobile telephone communication channel indicates that the universal address book server 130 will wait for time interval T1 before sending a subsequent message via the work telephone communication channel (indicated as the secondary communication channel via the priority level P2). If a response to the message transmitted by the mobile telephone communication channel is received within the time interval T1, no subsequent messages may be sent. However, if no response to the message sent via the mobile telephone communication channel is received within T1, the universal address book server 130 can transmit a second message via the work telephone communication channel. Accordingly, the universal address book server 130 will wait for the time interval T3 before sending a subsequent message via the email communication channel. If, however, a response to the message sent via the work telephone communication channel is received within the time interval T3, no subsequent messages may be sent. If, however, no response is received within the time interval T3, the universal address book server 130 may forward another message via the email communication channel and wait a further time interval T2 before sending any subsequent messages as described above.

Figure 7:
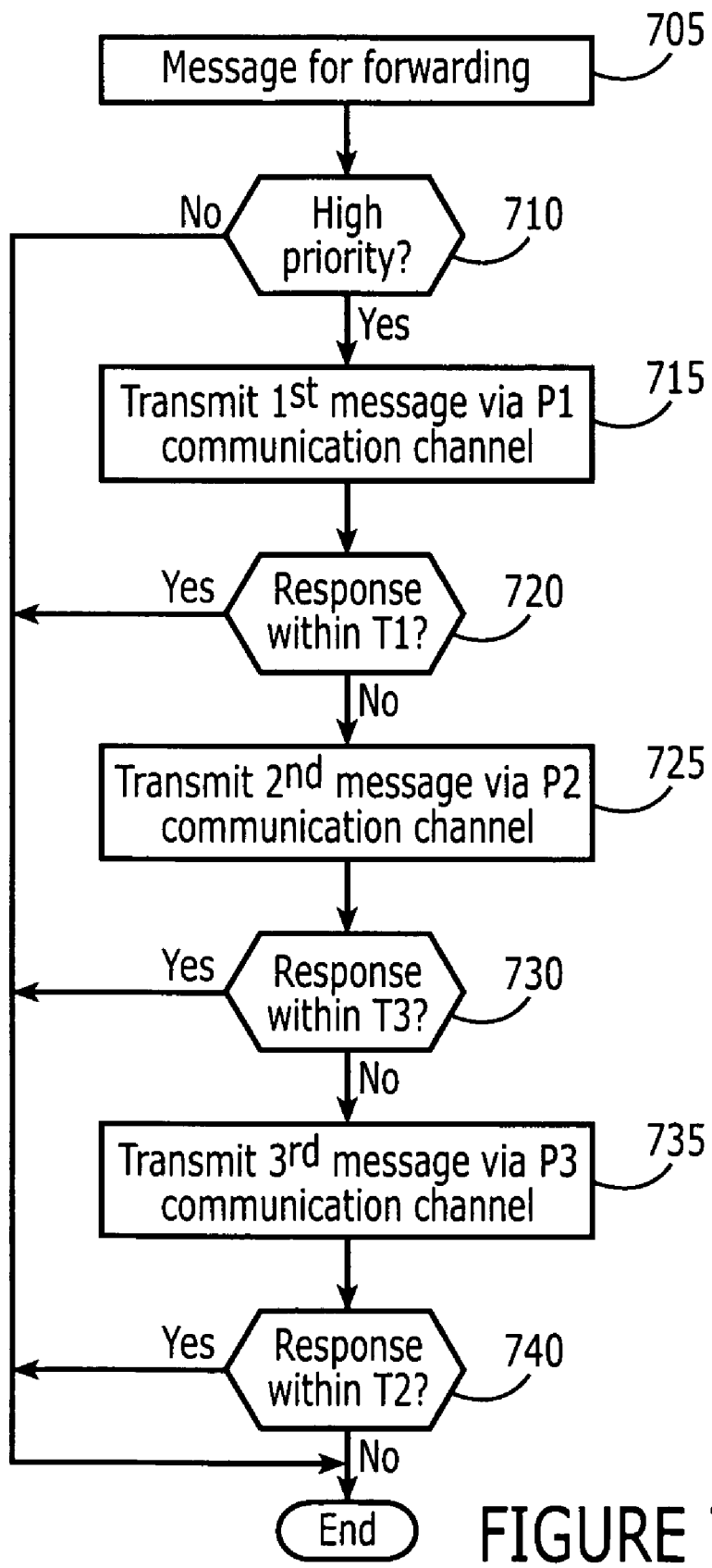
FIG. 7 is a flowchart that illustrates operations of a universal address book server according to some embodiments of the invention.

In operation as illustrated in FIG. 7, the message 307 is created/forwarded by access to the universal address book server 130 (block 705). If the message 307 is not a high priority message (block 710), the message is processed according to known techniques. If, however, the message 307 is a high priority message (block 710), the universal address book server 130 transmits a first message via the mobile telephone communication channel as being designated as the primary communication channel by the priority level P1 (block 715). If a response to the first message sent via the mobile telephone communication channel is received within time interval T1 (block 720), no further messages will be sent by the universal address book server. If, however, no response to the first message sent via the mobile telephone communication channel is received within the time interval T1 (block 720), the universal address book server 130 transmits a second message via the work telephone communication channel (block 725).

If a response to the second message transmitted via the work telephone communication channel is received within the time interval T3 (block 730), no subsequent messages may be sent by the universal address book server. If, however, no response is received during interval T3 (block 730), the universal address book server 130 can transmit a third message via the email communication channel (block 735). If a response to the third message sent via the e-mail communication channel is received within time interval T2 (block 740), the universal address book server 130 may send no further messages. If, however, no response to the third message is received within the interval T2 (block 740), the universal address book server 130 may forward any subsequent messages associated with remaining communication channels associated with addressee "John" as outlined above.

Figure 8:
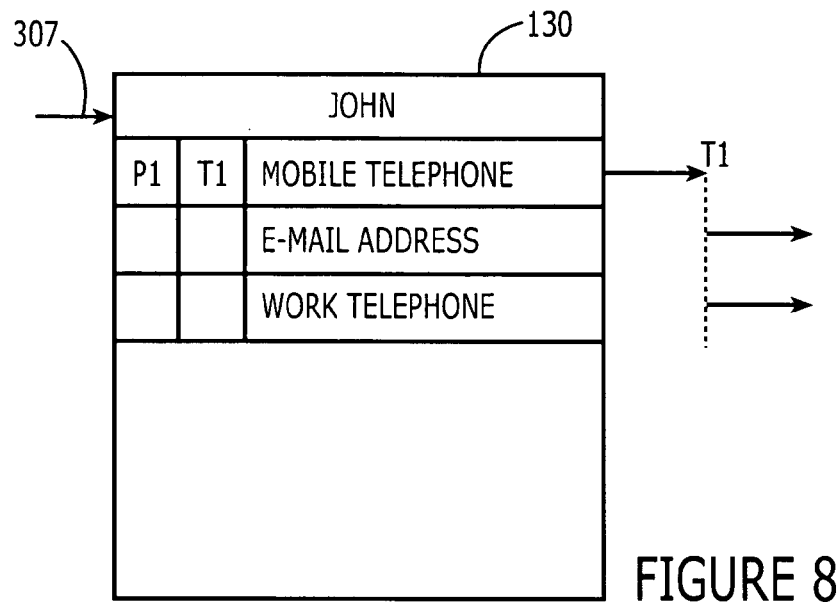
FIG. 8 is a schematic representation of a universal address book server according to some embodiments of the invention.

FIG. 8 is a schematic illustration of universal address book server 130 according to some embodiments of the invention. According to FIG. 8, a high priority message 307 is forwarded by the universal address book server 130 to an address "John" having an associated plurality of communication channels. In particular, addressee "John" has an associated plurality of communication channels including a mobile telephone communication channel, an email communication channel and a work telephone communication channel. Furthermore, the mobile telephone communication channel is designated as the primary communication channel by the priority level P1 associated therewith. The mobile telephone communication channel also has an associated time interval T1 associated therewith, which indicates that the universal address book server 130 will wait the time interval T1 before forwarding any subsequent messages.

Figure 9:
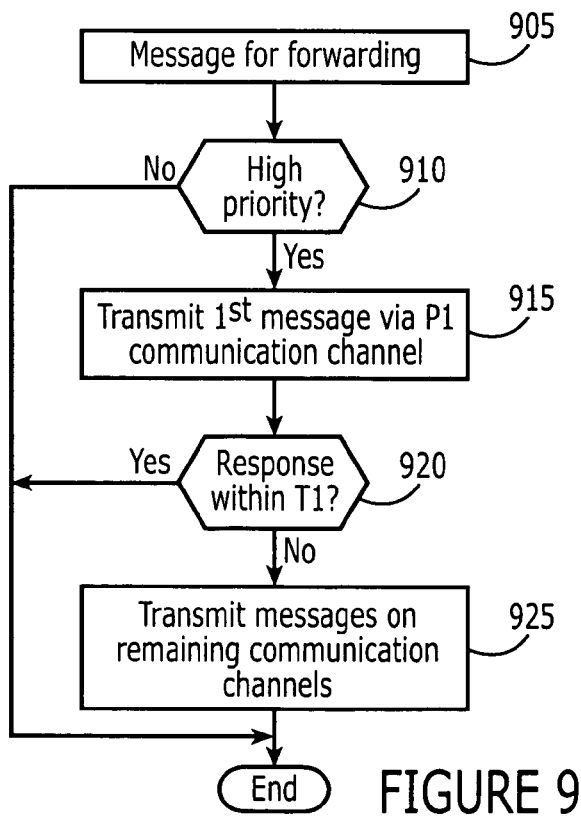
FIG. 9 is a flowchart that illustrates operations of a universal address book server according to some embodiments of the invention.

In operation as illustrated in FIG. 9, if the message 307 to be created/forwarded (block 905) is not a high priority message (block 910), the message is handled by known techniques. If, however, the message 307 is a high priority message (block 910), the universal address book server forwards a copy of the message 307 via the mobile telephone communication channel designated as the primary communication channel by the priority level P1 (block 915). If a response to the message forwarded by the mobile telephone communication channel is received within the interval T1 (block 920), no subsequent messages may be forwarded by the universal address book server 130. If, however, no response is received from the message transmitted via the mobile telephone communication channel during interval T1 (block 920), the universal address book server 130 forwards separate messages via the respective remaining ones of the plurality of communication channels associated with addressee "John" (block 925). In particular, the universal address book server 130 forwards a message via the email communication channel and separately forwards a message via the work telephone communication channel.

As described herein, some embodiments according to the invention can provide for forwarding of high priority messages via a plurality of communication channels associated with an addressee included in the universal address book server. In some embodiments according to the invention, a high priority message is forwarded by the universal address book server to an addressee via all communication channels that are associated therewith. In other embodiments according to the invention, time interval entries are associated with the plurality of communication channels for an addressee. The universal address book server can forward an initial message over a primary communications channel having a first time interval associated therewith. If a response to the message sent via the primary communication channel is not received within a first time interval, separate messages are forwarded via the remaining communication channels associated with the addressee. In still other embodiments according to the invention, separate messages can be forwarded in a serial "daisy-chained" manner after the expiration of an associated time interval entry associated with the respective communication channel in the universal address book server until a response is received.

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A method of providing communications comprising:
  forwarding a message from a universal address book server via a plurality of communications channels associated with an addressee of the message based on a priority of the message, wherein forwarding the message further comprises:
  providing a prioritized list of the communication channels indicating different orders in which the communication channels are to be used to forward the message based on the priority of the message;
  wherein forwarding comprises transmitting respective separate messages via the plurality of communications channels;
  wherein transmitting further comprises:
  transmitting each of the respective separate messages to respective ones of the plurality of communications channels after expiration of a respective time interval unless a response to a previously transmitted separate message is received by the universal address book server before expiration of the respective time interval for the previously transmitted separate message;

wherein the respective time intervals associated with the respective separate messages comprise different time intervals; and wherein higher priority messages are assigned shorter time intervals and lower priority messages are assigned longer time intervals.

2. A method according to claim 1 wherein transmitting further comprises:
   transmitting the respective separate messages via the plurality of communications channels for simultaneous delivery to a plurality of user devices associated therewith.

3. A method according to claim 1 wherein transmitting further comprises:
   transmitting a first one of the respective separate messages via a respective one of the plurality of communications channels that is designated as a primary communications channel;
   transmitting respective remaining separate messages via remaining ones of the plurality of communications channels if a response to the first one of the respective separate messages is not received by the universal address book server before expiration of a time interval; and
   avoiding transmitting the respective remaining separate messages via the remaining ones of the plurality of communications channels if the response is received by the universal address book server before expiration of a time interval.

4. A method according to claim 1 further comprising:
   transmitting an alert upon receiving a response to any of the respective separate messages.

5. A method according to claim 1 wherein transmitting further comprises:
   transmitting the respective separate messages via the plurality of communications channels to respective different addressee user devices.

6. A method according to claim 1 wherein the plurality of communications channels comprise an e-mail address, a mobile telephone number, a facsimile number, a home telephone number, a work telephone number, a voice mail telephone number, a messenger address, Internet Protocol (IP) address, and/or a pager telephone number.

7. A universal address book system comprising:
   a universal address book server configured to forward a message via a plurality of communications channels associated with an addressee of the message based on a priority of the message, wherein the address book server is further configured to provide a prioritized list of the communication channels indicating different orders in which the communication channels are to be used to forward the message based on the priority of the message;
   wherein the universal address book server is further configured to transmit respective separate messages via the plurality of communications channels;
   wherein the universal address book server is further configured to transmit each of the respective separate messages via respective ones of the plurality of communications channels after expiration of a respective time interval unless a response to a previously transmitted separate message is received by the universal address book server before expiration of the respective time interval for the previously transmitted separate message;
   wherein the respective time intervals associated with the respective separate messages comprise different time intervals; and
   wherein higher priority messages are assigned shorter time intervals and lower priority messages are assigned longer time intervals.

8. A system according to claim 7 wherein the universal address book server is further configured to transmit a first one of the respective separate messages via a respective one of the plurality of communications channels that is designated as a primary communications channel and to transmit respective remaining separate messages via remaining ones of the plurality of communications channels if a response to the first one of the respective separate messages is not received by the universal address book server before expiration of a time interval and configured to avoid transmitting the respective remaining separate messages via the remaining ones of the plurality of communications channels if the response is received by the universal address book server before expiration of the time interval.

9. A system according to claim 7 wherein the universal address book server further comprises:
   a plurality of entries associated with addressees to whom the message may be forwarded, wherein each of the plurality of communication channels is associated with a respective one of the plurality of entries; and
   a plurality of priority entries each associated with a respective one of the plurality of communication channels to indicate an order in which the plurality of communication channels is to be used to forward the message.

10. A system according to claim 7 further comprising:
    a plurality of time intervals each associated with a respective one of the plurality of communication channels.

11. A system according to claim 7 wherein the universal address book server is further configured to transmit an alert upon receiving a response to any of the respective separate messages.

12. A computer program product for providing communications comprising a computer readable medium having computer readable program code embodied therein, the computer readable program product comprising:
    computer readable program code configured to forward a message from a universal address book server via a plurality of communications channels associated with an addressee of the message based on a priority of the message, wherein the computer readable program code is further configured to provide a prioritized list of the communication channels indicating different orders in which the communication channels are to be used to forward the message based on the priority of the message;
    wherein the computer readable program code configured to forward a message comprises computer readable program code configured to transmit respective separate messages via the plurality of communications channels;
    wherein the computer readable program code configured to transmit further comprises:
    computer readable program code configured to transmit each of the respective separate messages via respective ones of the plurality of communications channels after expiration of a respective time interval unless a response to a previously transmitted separate message is received by the universal address book server before expiration of the respective time interval for the previously transmitted separate message;
    wherein the respective time intervals associated with the respective separate messages comprise different time intervals; and wherein higher priority messages are assigned shorter time intervals and lower priority messages are assigned longer time intervals.

13. A computer program product according to claim 12 wherein the computer readable program code configured to transmit further comprises:

computer readable program code configured to transmit a first one of the respective separate messages via a respective one of the plurality of communications channels that is designated as a primary communications channel;

computer readable program code configured to transmit respective remaining separate messages via remaining ones of the plurality of communications channels if a response to the first one of the respective separate messages is not received by the universal address book server before expiration of a time interval; and computer readable program code configured to avoid transmitting the respective remaining separate messages via the remaining ones of the plurality of communications channels if the response is received by the universal address book server before expiration of the time interval.

\* \* \* \* \*